US011380957B2

(12) United States Patent
Jia et al.

(10) Patent No.: US 11,380,957 B2
(45) Date of Patent: Jul. 5, 2022

(54) BATTERY PACKAGE HOUSING AND BATTERY PACK

(71) Applicant: DONGGUAN POWERAMP TECHNOLOGY LIMITED, Dongguan (CN)

(72) Inventors: Zhuocheng Jia, Fujian (CN); Kanzhu Huang, Fujian (CN)

(73) Assignee: NINGDE AMPEREX TECHNOLOGY LIMITED, Dongguan (CN)

( * ) Notice: Subject to any disclaimer, the term of this patent is extended or adjusted under 35 U.S.C. 154(b) by 496 days.

(21) Appl. No.: 16/395,279

(22) Filed: Apr. 26, 2019

(65) Prior Publication Data

US 2020/0287178 A1   Sep. 10, 2020

(30) Foreign Application Priority Data

Mar. 4, 2019   (CN) .......................... 201910160967.9

(51) Int. Cl.
*H01M 50/20*     (2021.01)
*H01M 10/0525*   (2010.01)
(Continued)

(52) U.S. Cl.
CPC ........... *H01M 50/20* (2021.01); *H01M 10/04* (2013.01); *H01M 10/0525* (2013.01); *H01M 10/4207* (2013.01); *H01M 50/572* (2021.01)

(58) Field of Classification Search
CPC .. H01M 50/20; H01M 10/04; H01M 10/0525; H01M 10/4207; H01M 50/572;
(Continued)

(56) References Cited

U.S. PATENT DOCUMENTS

| 2014/0160665 A1* | 6/2014 | Peng | G11B 33/128 361/679.33 |
| 2017/0214012 A1 | 7/2017 | Benedict et al. | |
| 2018/0138473 A1 | 5/2018 | Bessho | |

FOREIGN PATENT DOCUMENTS

| CN | 104835929 A | 8/2015 |
| CN | 206639822 U | 11/2017 |

(Continued)

OTHER PUBLICATIONS

Indian OA1 dated Nov. 3, 2021.
EESR issued in the corresponding EP Application No. 20766914.4 dated May 13, 2022.

*Primary Examiner* — Gary D Harris
(74) *Attorney, Agent, or Firm* — Ladas & Parry LLP

(57) ABSTRACT

The present application provides a package housing comprising a first end plate and a second end plate disposed opposite to the first end plate, and a first side plate and a second side plate disposed opposite to the first side plate. The first and second side plates is disposed between the first and second end plates, the first end plate is provided with a first through hole, the first side plate is provided with a protrusion passing through the first through hole. A fixing member detachably fixes the first end plate with the first side plate. The present application further provides a battery pack. The purpose of the present application is to solve at least the assembly difficulty of the soft-packaged lithium battery module in the case of a small assembly space, so as to improve the assembly convenience of the soft-packaged lithium battery module.

18 Claims, 6 Drawing Sheets

(51) Int. Cl.
   *H01M 10/04*      (2006.01)
   *H01M 10/42*      (2006.01)
   *H01M 50/572*     (2021.01)

(58) Field of Classification Search
   CPC . H01M 10/613; H01M 10/6555; Y02E 60/10;
                                          Y02P 70/50
   USPC ....................................................... 429/100
   See application file for complete search history.

(56) References Cited

FOREIGN PATENT DOCUMENTS

| | | |
|---|---|---|
| CN | 206806385 U | 12/2017 |
| CN | 107732063 A | 2/2018 |
| CN | 108075062 A | 5/2018 |
| CN | 207743294 U | 8/2018 |
| CN | 207818694 U | 9/2018 |
| EP | 3 285 311 A1 | 2/2018 |
| KR | 2017 0056306 A | 5/2017 |
| WO | 2018034471 A1 | 2/2018 |
| WO | 2018/042763 A1 | 3/2018 |
| WO | 2019/039139 A1 | 2/2019 |
| WO | 2019031170 A1 | 2/2019 |

\* cited by examiner

BATTERY PACKAGE HOUSING AND BATTERY PACK

CROSS-REFERENCE TO RELATED APPLICATIONS

The present application claims priority to Chinese Patent Application No. 201910160967.9, filed on Mar. 4, 2019, the content of which is incorporated herein by reference in its entirety.

FIELD OF THE INVENTION

The present application relates to the field of energy storage, more particularly, to a package housing and a battery pack.

BACKGROUND OF THE INVENTION

In the related art, the battery pack (battery module) mainly adopts the following three structures.

A first structure is using an holder to support an battery cell, and locking all the battery cells together by a long screw or steel cable tie to form a battery module. The disadvantage of this structure is that the cost of the module is high, and when the assembly space of the module is very narrow, the structure of the holder can only be designed to be weak, so that it is difficult to effectively support the battery cell.

A second structure is pressing all the battery cells together by upper and lower end plates, and using screws to lock the battery cells with the end plates to form a battery module. The disadvantage of this structure is that the module has experienced excessive locking force or the expansion force of the battery cell inside the module is too large, so that the electrolyte inside the battery cell overflows from the sealing edge, thereby causing serious harms, for example, liquid leakage, power leakage, etc.

A third structure is directly bundling all the battery cells together by tape to form a battery module. The disadvantage of this structure is that if the binding force of the tape is too small or the vibration impact force suffered by the module is too large, the phenomenon of tape locking pressure relaxation occurs, which further leads to structural instability such as loose internal structure of battery cells inside the module.

SUMMARY OF THE INVENTION

In view of the problems in the related art, an object of the present application is to provide a package housing and a battery pack, so as to solve the problem of assembly difficulty of the soft-packaged lithium battery module in a small assembly space, thereby improving the assembly convenience of the soft-packaged lithium battery module.

According to one aspect of present application, it provides a package housing including a first end plate and a second end plate disposed opposite to the first end plate; and a first side plate and a second side plate disposed opposite to the first side plate, the first side plate and the second side plate are disposed between the first end plate and the second end plate; wherein the first end plate is provided with a first through hole, and the first side plate is provided with a protrusion passing through the first through hole; and the package housing further includes a fixing member that detachably fixes the first end plate with the first side plate.

According to another aspect of present application, it further provides a battery pack including a plurality of battery cells connected in series or in parallel and a package housing, wherein the package housing includes: a first end plate and a second end plate disposed opposite to the first end plate; and a first side plate and a second side plate disposed opposite to the first side plate, the first side plate and the second side plate are disposed between the first end plate and the second end plate; wherein the first end plate is provided with a first through hole, and the first side plate is provided with a protrusion passing through the first through hole; and the package housing further includes a fixing member that detachably fixes the first end plate with the first side plate.

The beneficial technical effects of the present application are as follows:

By providing a fixing member on a package housing, the problem of assembly difficulty of the soft-packaged lithium battery module in the case of a small assembly space is solved, ease of assembly of soft-packaged lithium battery module is improved, and the cost of installation time is saved while the assembly process is simplified. Further, reserving a certain expansion space for the soft-packaged lithium battery module may prevent the internal pressure of the module from being excessive due to the expansion of the lithium ion battery.

DETAILED DESCRIPTION OF THE PREFERRED EMBODIMENTS

In order that the objectives, technical schemes and advantages of the present application will become more apparent, the present application will be described in more detail with reference to the drawings and examples above. It should be understood that the specific embodiments described herein are only for illustrating but not for limiting the present application. Based on the embodiments of the present application, all the other embodiments obtained by that of ordinary skill in the art without inventive effort are within the scope of the present application.

It should be noted that terms "comprising", "including" or any other variants herein are intended to cover the non-exclusive including, thereby making that the process, method, merchandise or device comprising a series of elements comprise not only those elements but also other elements that are not listed explicitly or the inherent elements to the process, method, merchandise or device. In the case of no more limitations, the element limited by the sentence "comprising a . . . " does not exclude that there exists another same element in the process, method, merchandise or device comprising the element. In the present application, the terms "first", "second", "third", etc. may be used herein to distinguish different components of a figure or series of figures. However, "first", "second", "third", etc. are not intended to describe the corresponding components.

In this application, "set", "connected", "coupled", "fixed", and the like, are used broadly, unless otherwise specified or limited. Moreover, those skilled in the art may understand that the above terms may be, for example, a fixed connection, a detachable connection or an integrated connection, depending on the specific situation, which may also be a mechanical connection or an electrical connection, an indirect connection that is directly connected or through an intermediary structure, or an internal communication of two components.

Figure 1A:
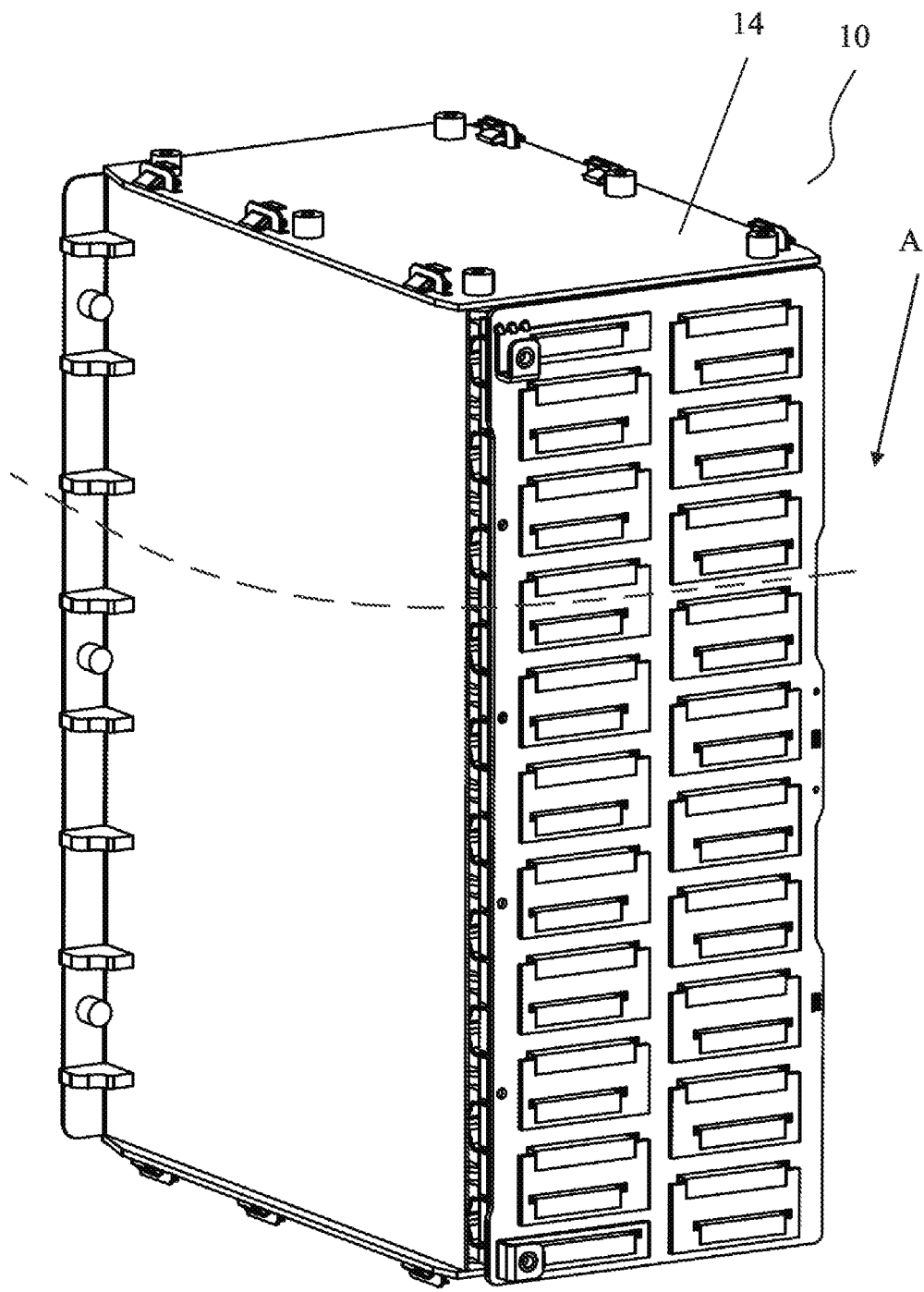
FIG. 1A is a structural schematic view of a battery pack according to an embodiment of the present application.
Figure 1B:
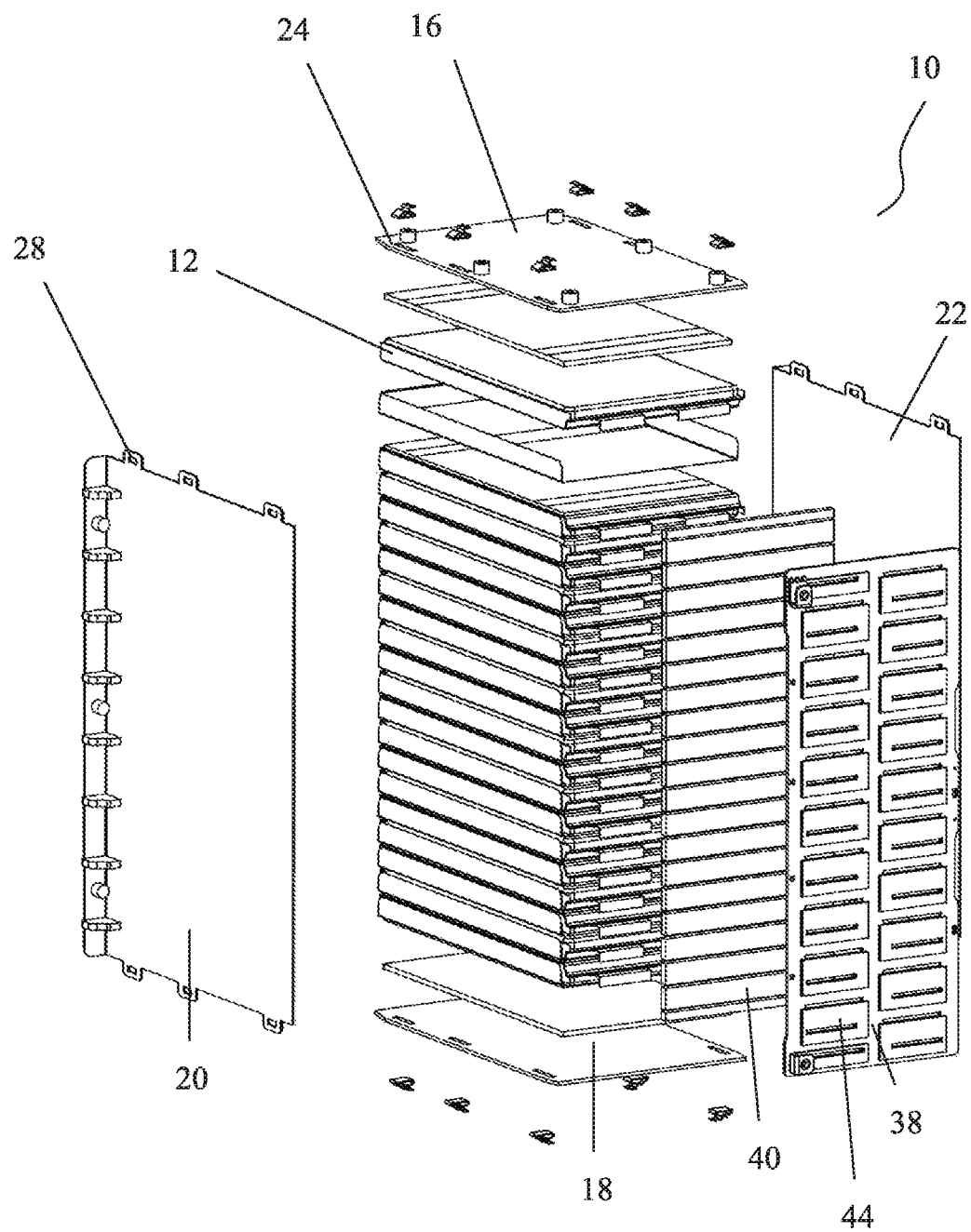
FIG. 1B shows an exploded view of the battery pack in the embodiment of FIG. 1A.
Figure 1C:
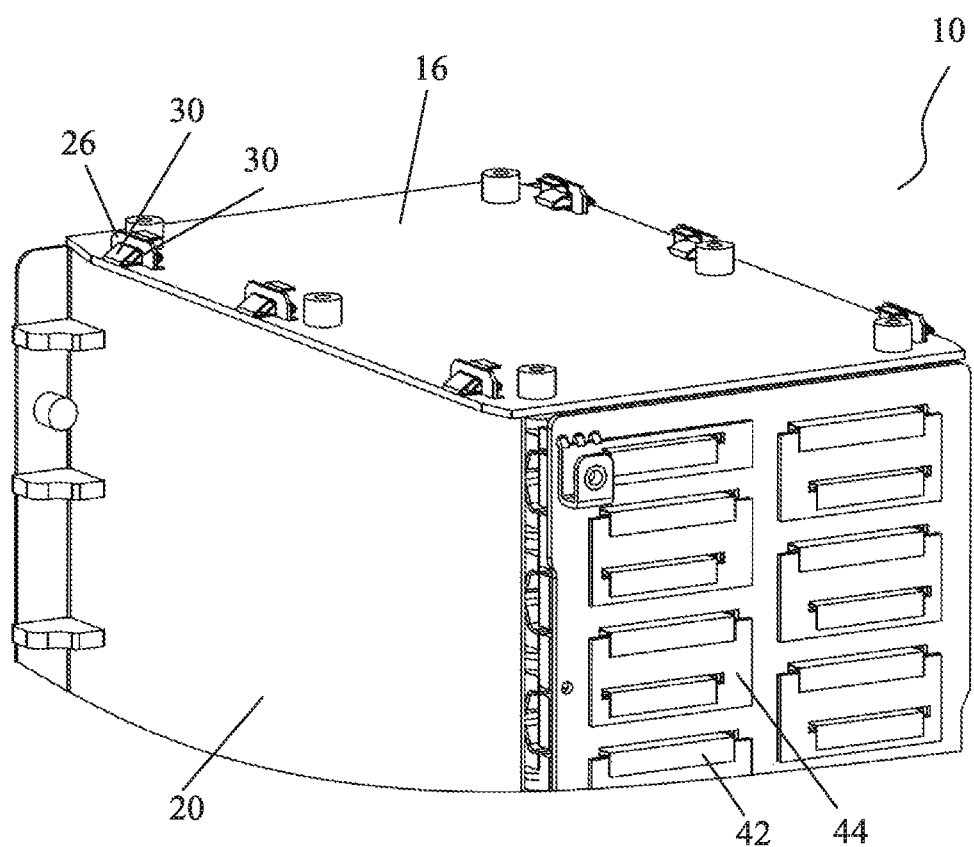
FIG. 1C is a partial enlarged view of a portion A of the embodiment shown in FIG. 1A.

FIGS. 1A and 1B respectively show a structural schematic view and an exploded view of a battery pack 10 according to an embodiment of the present application, and FIG. 1C shows a partial enlarged view of a portion A of the embodiment shown in FIG. 1A. The battery pack 10 includes a plurality of battery cells 12 and a package housing 14, the plurality of battery cells 12 are connected in series or in parallel. The plurality of battery cells 12 may be stacked along a thickness direction of the battery cell 12 to form a body of the battery pack, and the package housing 14 partially encloses the body of the battery pack.

An embodiment of the present application provides a package housing 14 including a first end plate 16 and a second end plate 18 disposed opposite to the first end plate 16, and a first side plate 20 and a second side plate 22 disposed opposite to the first side plate 20. The first side plate 20 and the second side plate 22 are disposed between the first end plate 16 and the second end plate 18, respectively. Among them, the first end plate 16 is provided with a first through hole 24, and the first side plate 20 is provided with a protrusion 26 passing through the first through hole 24. The package housing 14 further includes a fixing member 30, and the fixing member 30 detachably fixes the first end plate 16 with the first side plate 20 or the second side plate 22, or is used to fix the second end plate 18 with the first side plate 20 or the second side plate 22. According to an embodiment of the present application, the fixing member 30 may be a snap-spring fastening device. The first end plate 16 and the second end plate 18 may press tightly the battery pack in a thickness direction of the battery cell 12, and the first end plate 16 and the second end plate 18 may be steel plates functioning as a protection for the battery cell 12, and may also be other metal plates or plastic plates, etc. The first side plate 20 and the second side plate 22 may position the battery pack 12 in a width direction of the battery cell 12, and the first side plate 20 and the second side plate 22 may be steel plates functioning as a protection for the battery cell 12, and may also be other metal plates or plastic plates, etc.

In an embodiment, the second end plate 18 may include the same or similar design as the first end plate 16, and the second side plate 22 may also include the same or similar design as the first side plate 20. That is to say, the second end plate 18 is connected to the first side plate 20 and the first end plate 16 is connected to the first side plate 20 in a same manner, and the second side plate 22 is connected to the first end plate 16 or the second end plate 18 in a same manner as the first side plate 20. Therefore, in some embodiments, the first end plate 16 and the second end plate 18 may each be provided with a fixing member 30 to further improve the assembly convenience of the battery module.

According to an embodiment of the present application, the fixing member 30 is an elastic member, and the fixing member 30 is deformed in a direction perpendicular to a main plane of the first end plate 16 or the second end plate 18. For example, the fixing member 30 may be deformed in a thickness direction of the battery cell 12. Through this arrangement, the assembly convenience of the soft-packaged lithium battery module may be further improved, and a certain expansion space may be reserved for the battery module to prevent the internal pressure of the module from being excessive due to the expansion of the battery module. The deformation of the fixing member 30 is an elastic deformation, that is, the fixing member 30 may be compressed or expanded in a direction perpendicular to the main plane of the first end plate 16 or the second end plate 18.

In an embodiment, a material of the fixing member 30 may be one or more of low carbon steel, Fe—Ni alloy, Cu—Zn alloy, Fe—Mn alloy, etc. In an embodiment, the material of the fixing member 30 may be Fe—Mn alloy since the Fe—Mn alloy has good elastic properties and may meet the functional requirements of the fixing member 30.

According to an embodiment of the present application, the protrusion 26 includes a second through hole 28, and the fixing member 30 detachably passes through the second through hole 28 to fix the first end plate 16 with the first side plate 20 or the second side plate 22. By providing the second through hole 28, the assembly convenience of the soft-packaged lithium ion battery module may be further improved. In an embodiment, the fixing member 30 is deformed in a direction perpendicular to a main plane of the first end plate 16 or the second end plate 18.

Figure 2A:
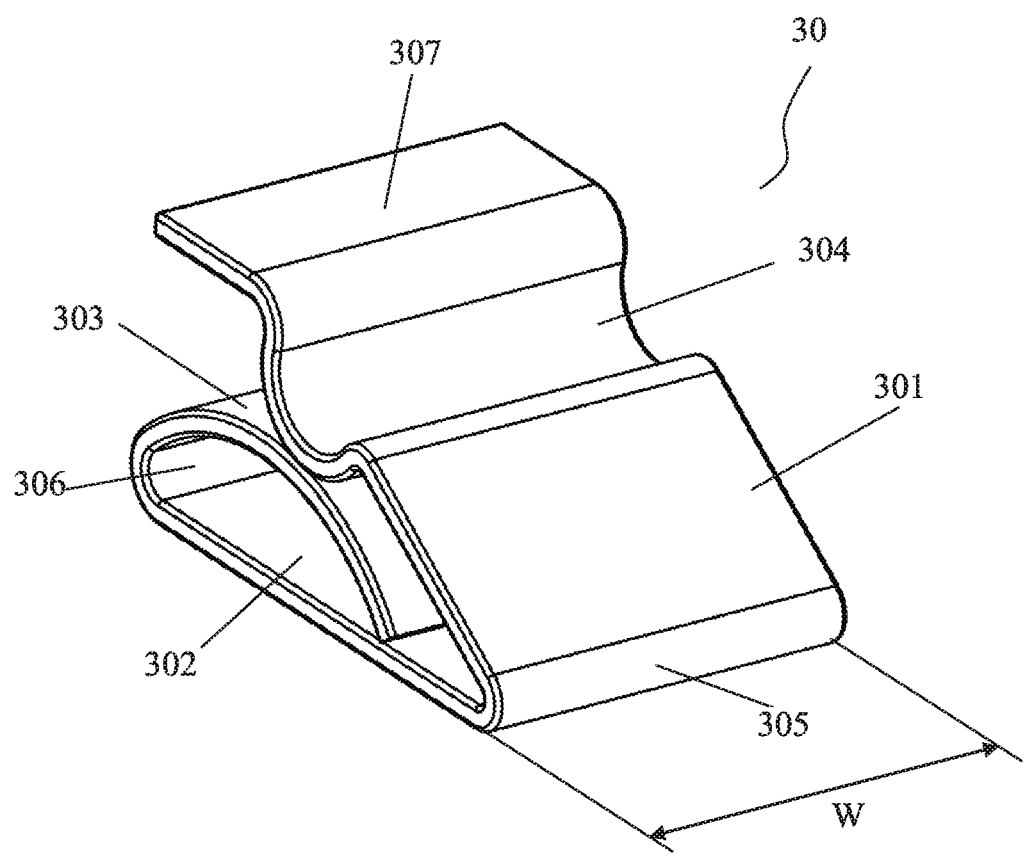
FIG. 2A is a perspective view of a fixing member according to an embodiment of the present application.
Figure 2B:
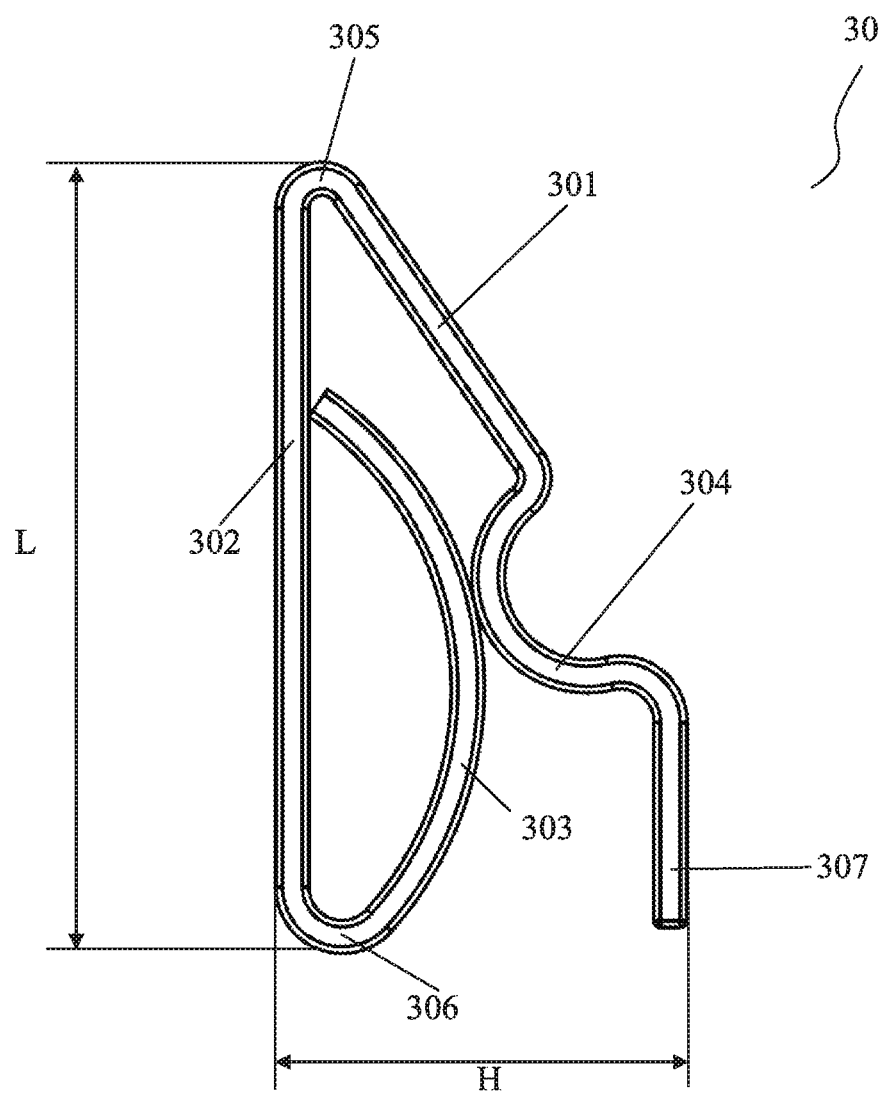
FIG. 2B shows a side view of the fixing member in the embodiment of FIG. 2A.

According to an embodiment of the present application, referring to FIGS. 2A and 2B, the fixing member 30 includes a first block 301 and a second block 302. One end of the first block 301 is connected to one end of the second block 302, and an angle between the first block 301 and the second block 302 is less than 90 degrees. When the fixing member 30 is deformed in a direction perpendicular to the main plane of the first end plate 16 or the second end plate 18, the angle between the first block 301 and the second block 302 may be changed. In some embodiments, the angle between the first block 301 and the second block 302 is less than 45 degrees.

In an embodiment of the present application, as shown in FIGS. 2A and 2B, the fixing member 30 further includes a first curved surface 303. One end of the second block 302 is connected to the first block 301, and the other end thereof is connected to one end of the first curved surface 303. The other end of the first curved surface 303 is disposed between the first block 301 and the second block 302 and abuts on the second block 302. The first curved surface 303 protrudes toward the first block 301, and the first curved surface 303 may be in contact with the first block 301. In an embodiment, a surface of the first block 301 abuts an inner wall of the second through hole 28, and a surface of the second block 302 abuts the main plane of the first end plate 16 or the second end plate 18. Since the surface of the first curved surface 303 abuts the first block 301, as the angle between the first block 301 and the second block 302 changes during the assembly or expansion of the battery module, the first curved surface 303 may be deformed in a direction perpendicular to the main plane of the first end plate 16 or the second end plate 18.

According to an embodiment of the present application, the first block 301 includes a second curved surface 304 extending toward the first curved surface 303, an inner surface of the second curved surface 304 abuts against the inner wall of the second through hole 28, and an outer surface of the second curved surface 304 abuts an outer surface of the first curved surface 303, as shown in FIGS. 2A and 2B. By providing the second curved surface 304, the assembly convenience of the soft-packaged lithium battery module may be further improved, and the assembly process may be simplified.

According to an embodiment of the present application, the first block 301 is connected to the second block 302 through a first arcuate surface 305, or the second block 302 is connected to the first curved surface 303 through a second arcuate surface 306, as shown in FIGS. 2A and 2B. The arrangement of the first arcuate surface 305 and the second arcuate surface 306 may prevent the fixing member 30 from being broken, extend the service life of the fixing member 30, and simplify the assembly process and facilitate the manufacture of the fixing member 30.

In an embodiment, as shown in FIGS. 2A and 2B, the first block 301 further includes an operation plane 307, the operation plane 307 is disposed at an end of the first block 301 away from the second block 302, and the operation plane 307 is connected to the second curved surface 304. By pressing the operation plane 307, a connection angle between the first block 301 and the second block 302 may be changed, and a distance from the second curved surface 304 to the second block 302 may be changed. By pressing the operation plane 307, the fixing member 30 is compressed and deformed, and then may partially pass through an inner side of the second through hole 28 (the inner side refers to a side away from an edge of the first end plate 16 or the second end plate 18) to fix the first end plate 16 with the first side plate 20 or the second side plate 22. Among them, the insertion of the fixing member 30 from the inner side of the second through hole 28 may prevent the opening of the operation plane 307 of the fixing member 30 from being harmful to the assembly operator when the fixing member 30 is inserted from an outer side of the second through hole 28. The fixing member 30 may generate an initial compression deformation after being inserted into the second through hole 28, thereby providing the battery pack 10 with a certain locking pressure, that is, providing the battery cell 12 with a certain pre-pressure. In addition, since the fixing member 30 has elasticity, the expansion force generated when the battery pack is expanded causes the fixing member 30 to be deformed in a direction perpendicular to the main plane of the first end plate 16 or the second end plate 18. That is to say, the fixing member 30 may reserve a certain expansion space for the battery pack to prevent the internal pressure of the battery module from being excessively large.

According to an embodiment of the present application, a length L of the fixing member 30 ranges from 8 mm to 16 mm. In some embodiments, the length L of the fixing member 30 ranges from 10 mm to 14 mm. In some embodiments, a width W of the fixing member 30 ranges from 4 mm to 12 mm. In some embodiments, the width W of the fixing member 30 ranges from 6 mm to 10 mm. In some embodiments, a height H of the fixing member 30 ranges from 4 mm to 12 mm. In some embodiments, the height H of the fixing member 30 ranges from 6 mm to 10 mm.

In some embodiments, the first curved surface 303 is a minor arc of $\pi/2-2*\pi/3$ (i.e., a minor arc corresponding to 90 degrees to 120 degrees). In some embodiments, a length of the second block 302 is d1, an arc length of the first curved surface 303 is less than d1, and a radius of the first curved surface 303 is $3*d1/(2*\pi-2*d1/\pi)$. In some embodiments, the first curved surface 303 has a radius of 3 mm to 9 mm. In some embodiments, the first curved surface 303 has a radius of 5 mm to 8 mm.

In some embodiments, a thickness of the first side plate 20 or the second side plate 22 is t1, and a radius of the second curved surface is greater than t1 and less than $2.5*t1$, to prevent the fixing member 30 from slipping out of the protrusion 26 during use. In some embodiments, the second curved surface 304 has a radius of 1 mm to 2.5 mm. In some embodiments, the second curved surface 304 has a radius of 1.2 mm to 2.0 mm.

In some embodiments, the first arcuate surface 305 has a radius of 0.5 mm to 1.5 mm. The radius of the first arcuate surface 305 should be as large as possible, which is greater than a thickness t2 of the fixing member 30, and smaller than half a distance d from a top wall of the second through hole 28 to an upper surface of the first end plate 16. That is to say, the radius of the first arcuate surface 305 may be determined by the thickness t2 of the fixing member 30 and the distance d. It should be noted that the thickness t2 of the fixing member 30 may refer to a thickness of the first block 301, the second block 302 or the first curved surface 303. In some embodiments, the first arcuate surface 305 has a radius of 0.8 mm to 1.2 mm.

In some embodiments, a radius of the second arcuate surface 306 is $2*t2-3*t2$, and t2 is a thickness of the fixing member 30. In some embodiments, the second arcuate surface 306 has a radius of 0.6 mm to 3 mm. The radius of the second arcuate surface 306 may be greater than the radius of the first arcuate surface 305 to further prevent the fixing member 30 from breaking. In some embodiments, the second arcuate surface 306 has a radius of 1.0 mm to 2.5 mm.

In some embodiments, the thickness t2 of the fixing member 30 ranges from 0.3 mm to 1 mm. In some embodiments, the thickness t2 of the fixing member 30 ranges from 0.5 mm to 0.8 mm. In some embodiments, an initial compression deformation amount of the fixing member 30 ranges from 0.4 mm to 3 mm (that is, a certain pre-pressure is required for the battery pack), and the compression deformation amount of the fixing member 30 may range from 0 mm to 8 mm. In some embodiments, the compression deformation amount of the fixing member 30 ranges from 2 mm to 6 mm.

Figure 3:
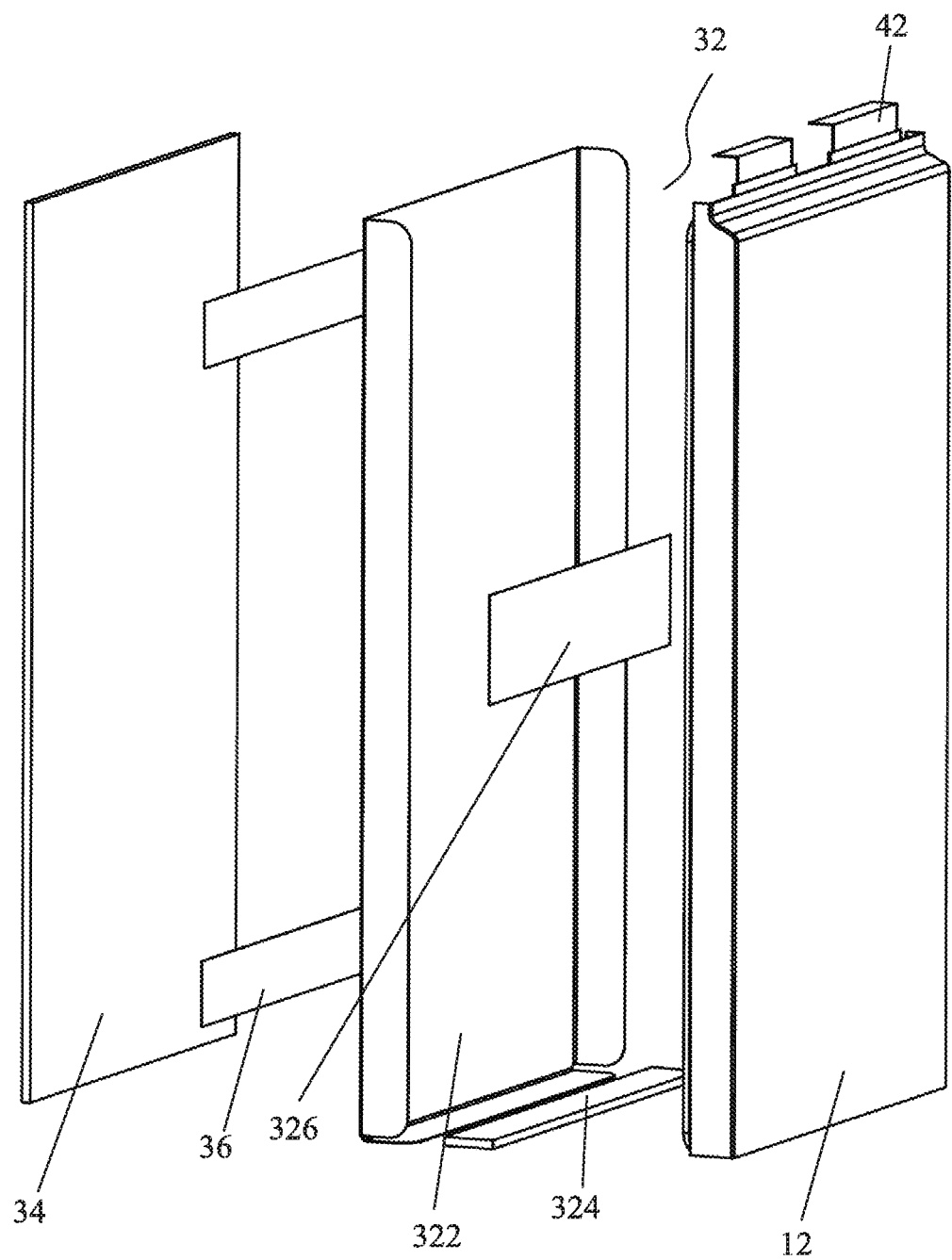
FIG. 3 is a view showing the assembly relationship of the battery pack according to an embodiment of the present application.

According to an embodiment of the present application, referring specifically to FIG. 3, a cooling fin 322, an battery cell 12 and a first elastic layer 324 constitute an battery cell assembly 32, and the cooling fin 322 connects with the battery cell 12 by a first adhesive layer 326, the cooling fin 322 is partially surrounding the battery cell 12. The first elastic layer 324 may be foam or may be another elastic substance layer that is compressively deformed to provide a buffer protection for the battery cell 12 in its length direction. The first adhesive layer 326 may be a double-sided adhesive having a bonding action, or may be formed by brushing a surface of the cooling fin 322 or the battery cell 12 with an adhesive (e.g., employing solvent-based polyurethane glue, etc.). The cooling fin 322 may be an aluminum sheet or other thermally conductive sheet having good thermal conductivity. In some embodiments, the first elastic layer 324 may be disposed between an end of the battery cell 12 that is not provided with an tab 42 and the cooling fin 322. The cooling fin 322 derives the heat generated from the battery cell 12 by being in close contact with the battery cell 12, and a side wall of the cooling fin 322 is in contact with the first side plate 20 and the second side plate 22 to further improve the heat dissipation effect of the battery pack 10.

According to an embodiment of the present application, the battery pack 10 may include a plurality of battery cell assemblies 32 stacked on each other, and the plurality of battery cell assemblies 32 are stacked in a thickness direction of the battery cell 12. In some embodiments, a second elastic layer 34 is disposed between adjacent battery cell assemblies 32, and the second elastic layer 34 may further be disposed between the battery cell assembly 32 and the first end plate 16 or the second end plate 18. The second elastic layer 34 may also be foam or may also be another elastic substance layer that is compressively deformed to provide a buffer protection for the battery cell 12 in its thickness direction. The second elastic layer 34 is connected to the cooling fin 322 or the battery cell 12 by a second adhesive layer 36. The second adhesive layer 36 may also be a double-sided adhesive, or may be formed by brushing a surface of the cooling fin 322 or the second elastic layer 34 with an adhesive (e.g., using an aqueous polyacrylic pressure sensitive adhesive, etc.). The second elastic layer 34 may be pressed by a pre-tightening force to provide a certain pre-pressure to the battery cell 12, and absorb an amount of expansion of the battery cell 12 during use by the compressive deformation. The first end plate 16 and the second end plate 18 are locked together with the first side plate 20 and the second side plate 22 by the fixing member 30, and provide a pre-pressure to the battery cell 12 by squeezing the second elastic layer 34 to transfer a locking pressure to the battery cell 12. When the battery cell 12 expands and the amount of expansion exceeds the compression limit of the second elastic layer 34, the fixing member 30 may further subjects compression deformation, thereby providing the battery pack 10 with a certain expansion space to prevent the pressure inside the battery pack from being excessive.

According to an embodiment of the present application, the battery pack 10 may further includes an adapter plate 38 and a third elastic layer 40 disposed between the battery cell 12 and the adapter plate 38. An tab 42 of the battery cell 12 may pass through the third elastic layer 40 and be electrically connected to a connecting copper sheet 44 (or a connecting copper bar) disposed on the adapter plate 38. In one embodiment, the connecting copper sheet 44 serves primarily to connect the individual battery cell 12 to form a current loop and also to assist in welding. In some embodiments, the connecting copper sheet 44 may be a thin copper sheet or other thin metal sheet capable of passing current and/or assisting welding, such as a connecting aluminum sheet, etc. In some embodiments, a surface of the connecting aluminum sheet may be plated with nickel to prevent oxidation and also to facilitate welding. The adapter plate 38 is a printed circuit board (PCB) that is fixedly connected to the connecting copper sheet 44. The PCB also has a function of connecting a voltage collecting circuit. The PCB is further provided with a line for collecting the voltage of the battery cell 12 and the temperature of the battery cell 12. The tab 42 may be welded to the connecting copper sheet 44 of the adapter plate 38 by a welding process such as laser welding, and the connecting copper sheet 44 is fixed on the adapter plate 38 by an SMT (Surface Mount Technology) process. The tabs 42 between the individual battery cells 12 may be isolated from each other by the third elastic layer 40, and the third elastic layer 40 may support the tabs 42 of the individual battery cells 12.

The embodiment of the present application provides a package housing 14 having a fixing member 30, which may effectively solve the assembly difficulty problem of the object to be packaged in a small assembly space, and improves the assembly convenience of the soft-packaged lithium ion battery module.

The embodiment of the present application further provides a battery pack that may be disposed in the package housing 14 of any one of the above types. By providing a fixing member 30 on the package housing 14, the problem of assembly difficulty of the soft-packaged lithium battery module in the case of a small assembly space may be effectively solved, ease of assembly of soft-packaged lithium ion battery module is improved, and the cost of installation time is saved while the assembly process is simplified. A certain expansion space is reserved for the battery module to prevent the internal pressure of the module from being excessive due to the expansion of the lithium ion battery.

The foregoing is merely illustrative of the preferred embodiments of the present application and is not intended to be limiting of the present application, and various changes and modifications may be made by those skilled in the art. Any modifications, equivalent substitutions, improvements, and the like within the spirit and principles of the application are intended to be included within the scope of the present application.

What is claimed is:

1. A package housing,
comprising: a first end plate;
a second end plate disposed opposite to the first end plate;
a first side plate; and
a second side plate disposed opposite to the first side plate, the first side plate and the second side plate are disposed between the first end plate and the second end plate;
wherein the first end plate is provided with a first through hole, and the first side plate is provided with a protrusion passing through the first through hole; and
the package housing further comprises a fixing member that detachably fixes the first end plate with the first side plate, wherein the fixing member is a metallic elastic member, and the fixing member is deformed in a direction perpendicular to a main plane of the first end plate.

2. The package housing according to claim 1, wherein a deformation amount of the fixing member is greater than 0 mm and less than or equal to 8 mm.

3. The package housing according to claim 1, wherein the protrusion comprises a second through hole, and the fixing member passes through the second through hole to fix the first end plate with the first side plate.

4. The package housing according to claim 3, wherein the fixing member comprises:
a first block;
a second block, one end of the first block is connected to one end of the second block, and an angle between the first block and the second block is less than 90 degrees; and
a first curved surface, the other end of the second block is connected to one end of the first curved surface, the other end of the first curved surface is disposed between the first block and the second block, and the first curved surface protrudes toward the first block;
wherein a surface of the first block abuts an inner wall of the second through hole, a surface of the second block abuts a main plane of the first end plate, a surface of the first curved surface abuts the first block, and the first curved surface may be deformed in a direction perpendicular to the main plane of the first end plate.

5. The package housing according to claim 4, wherein a radius of the first curved surface is in a range of about 3 mm to about 9 mm.

6. The package housing according to claim 4, wherein the first block comprises a second curved surface extending toward the first curved surface, an inner surface of the second curved surface abuts the inner wall of the second through hole, and an outer surface of the second curved surface abuts an outer surface of the first curved surface.

7. The package housing according to claim 6, wherein a radius of the second curved surface is in a range of about 1 mm to about 2.5 mm.

8. The package housing according to claim 4, wherein the first block is connected to the second block by a first arcuate surface or the second block is connected to the first curved surface by a second arcuate surface.

9. The package housing according to claim 8, wherein a radius of the first arcuate surface is in a range of about 0.5 mm to about 1.5 mm, or a radius of the second arcuate surface is in a range of about 0.6 mm to about 3 mm.

10. A battery pack, comprising:
a plurality of battery cells connected in series or in parallel; and a package housing, wherein the package housing comprises:
a first end plate;
a second end plate disposed opposite to the first end plate;
a first side plate;
a second side plate disposed opposite to the first side plate, the first side plate and the second side plate are disposed between the first end plate and the second end plate;
wherein the first end plate is provided with a first through hole, and the first side plate is provided with a protrusion passing through the first through hole; and
the package housing further comprises a fixing member that detachably fixes the first end plate with the first side plate, wherein the fixing member is a metallic elastic member, and the fixing member is deformed in a direction perpendicular to a main plane of the first end plate.

11. The battery pack according to claim 10, wherein a deformation amount of the fixing member is greater than 0 mm and less than or equal to 8 mm.

12. The battery pack according to claim 10, wherein the protrusion comprises a second through hole and the fixing member passes through the second through hole to fix the first end plate with the first side plate.

13. The battery pack according to claim 12, wherein the fixing member comprises:
a first block;
a second block, one end of the first block is connected to one end of the second block, and an angle between the first block and the second block is less than 90 degrees; and
a first curved surface, the other end of the second block is connected
to one end of the first curved surface, the other end of the first curved surface is disposed between the first block and the second block, and the first curved surface protrudes toward the first block;
wherein a surface of the first block abuts an inner wall of the second through hole, a surface of the second block abuts a main plane of the first end plate, a surface of the first curved surface abuts the first block, and the first curved surface may be deformed in a direction perpendicular to the main plane of the first end plate.

14. The battery pack according to claim 13, wherein a radius of the first curved surface is in a range of about 3 mm to about 9 mm.

15. The battery pack according to claim 13, wherein the first block comprises a second curved surface extending toward the first curved surface, an inner surface of the second curved surface abuts the inner wall of the second through hole, and an outer surface of the second curved surface abuts an outer surface of the first curved surface.

16. The battery pack according to claim 15, wherein a radius of the second curved surface is in a range of about 1 mm to about 2.5 mm.

17. The battery pack according to claim 13, wherein the first block is connected to the second block by a first arcuate surface or the second block is connected to the first curved surface by a second arcuate surface.

18. The battery pack according to claim 17, wherein a radius of the first arcuate surface is 0.5 mm-1.5 mm or a radius of the second arcuate surface is in a range of about 0.6 mm to about 3 mm.

* * * * *